(12) United States Patent
Bern et al.

(10) Patent No.: US 11,073,307 B2
(45) Date of Patent: Jul. 27, 2021

(54) CALIBRATION METHOD AND CALIBRATION DEVICE FOR A GROUP OF REFLECTORS FOR CONCENTRATING SOLAR RADIATION ONTO A RADIATION RECEIVER

(71) Applicant: Fraunhofer-Gesellschaft zur Forderung der Angewandten Forschung e.V., Munich (DE)

(72) Inventors: Gregor Bern, Freiburg (DE); Peter Schoettl, Freiburg (DE); De Wet Van Rooyen, Freiburg (DE); Peter Nitz, Gundelfingen (DE); Anna Heimsath, Freiburg (DE)

(73) Assignee: Fraunhofer-Gesellschaft zur Förderung der Angewandten Forschung e.V., Munich (DE)

( * ) Notice: Subject to any disclaimer, the term of this patent is extended or adjusted under 35 U.S.C. 154(b) by 199 days.

(21) Appl. No.: 16/339,881

(22) PCT Filed: Sep. 26, 2017

(86) PCT No.: PCT/EP2017/074365
§ 371 (c)(1),
(2) Date: Apr. 5, 2019

(87) PCT Pub. No.: WO2018/065261
PCT Pub. Date: Apr. 12, 2018

(65) Prior Publication Data
US 2019/0264953 A1    Aug. 29, 2019

(30) Foreign Application Priority Data
Oct. 6, 2016 (DE) .......................... 102016119000.4

(51) Int. Cl.
G06K 9/00 (2006.01)
F24S 50/80 (2018.01)
F24S 50/20 (2018.01)

(52) U.S. Cl.
CPC ............... *F24S 50/80* (2018.05); *F24S 50/20* (2018.05); *F24S 2050/25* (2018.05); *Y02E 10/47* (2013.01)

(58) Field of Classification Search
CPC ........ F24S 2050/25; F24S 50/20; F24S 50/80; Y02E 10/47
See application file for complete search history.

(56) References Cited

U.S. PATENT DOCUMENTS 4,564,275 A * 1/1986 Stone .................... G01S 3/7861
353/3
4,836,672 A * 6/1989 Naiman .................. G01S 7/495
126/573

(Continued)

FOREIGN PATENT DOCUMENTS

CN 102116604 7/2011
WO 2009152573 12/2009

*Primary Examiner* — Avinash Yentrapati
(74) *Attorney, Agent, or Firm* — Volpe Koenig (57) ABSTRACT

The invention relates to a calibration method for a group of reflectors for concentrating solar radiation onto a radiation receiver, having the following steps: A) aligning the reflectors in order to at least partly expose a calibration surface to solar radiation reflected by the reflectors; B) modifying the intensity distribution of the radiation incident on the calibration surface by carrying out a pattern of movements by each reflector of the group, wherein at least one specified parameter for the pattern of movements of each reflector differs from the parameters of the other reflectors, said parameter being selected from the group: —movement frequency,—movement amplitude,—movement phase angle, and—trajectory of the solar radiation, reflected by the reflector, within the calibration surface; C) recording rows of pixels for a plurality of differently located location points of the calibration surface by at least one camera, each row of pixel having at least five temporally offset pixel recordings;

(Continued)

D) ascertaining a spectrum for each row of pixels by transforming the row of pixels into the frequency domain; E) assigning a subset of spectra to the reflectors on the basis of the movement pattern parameter of the reflector; and F) determining at least one reflection target position for each reflector at least on the basis of the subset of spectra assigned to the reflector. The invention additionally relates to a calibration device for a group of reflectors for concentrating solar radiation onto a radiation receiver.

20 Claims, 4 Drawing Sheets

(56) References Cited

U.S. PATENT DOCUMENTS

| | | | | |
|---|---|---|---|---|
| 9,435,740 | B2* | 9/2016 | Haunschild | G01N 21/9501 |
| 2010/0252024 | A1* | 10/2010 | Convery | F24S 50/20 |
| | | | | 126/578 |
| 2011/0317876 | A1* | 12/2011 | Bender | F24S 50/20 |
| | | | | 382/103 |
| 2012/0174962 | A1* | 7/2012 | Koningstein | F24S 40/85 |
| | | | | 136/246 |
| 2013/0021471 | A1* | 1/2013 | Waterhouse | F24S 50/20 |
| | | | | 348/139 |
| 2013/0048752 | A1* | 2/2013 | Gilon | F24S 30/452 |
| | | | | 239/165 |
| 2013/0306131 | A1* | 11/2013 | Blum | F24S 23/70 |
| | | | | 136/246 |

* cited by examiner

CALIBRATION METHOD AND CALIBRATION DEVICE FOR A GROUP OF REFLECTORS FOR CONCENTRATING SOLAR RADIATION ONTO A RADIATION RECEIVER

BACKGROUND

The invention relates to a calibration method and a calibration apparatus for a group of reflectors for concentrating solar radiation onto a radiation receiver.

The practice of concentrating solar radiation onto a radiation receiver by a plurality of reflectors for the purposes of using solar energy is known. Here, a solar tower and systems in which incident solar radiation is concentrated onto a radiation receiver by reflectors embodied as heliostats are known. Linear collectors, such as linear Fresnel collectors, for example, in which mirror systems tracked along one axis and arranged in series concentrate the incident solar radiation onto a linear receiver, typically by way of additional secondary concentrator optics, are likewise known.

The radiation concentrated on the radiation receiver leads to heating, wherein the thermal energy can be converted into electrical or mechanical energy for further use. The direct use of the thermal energy, for example for industrial processes, is likewise possible.

Due to the relative movement between Sun and Earth, the reflectors must be tracked to ensure that the sunlight is continuously concentrated on the (stationary) radiation receiver. To this end, the reflectors have motor drives in order to be able to specify a position of the reflectors and thus obtain tracking of the changing position of the sun.

A problem in this case is that incorrect positioning occurs due to mechanical changes, external influences or wear of the motor drives, and so the reflectors do not reflect the sunlight, or only still partly reflect the sunlight, on an envisaged target position on the radiation receiver.

Therefore, methods are known for ascertaining a reflector target position, which reproduces the actual positioning of the reflector. This reflector target position can be compared to the specified reflector intended position, and thus allows a deviation to be determined. The reflector intended position consequently reproduces the desired spatial position of the reflected radiation on a target surface. A control unit of the motor drives for the reflector can be calibrated by the ascertained deviation between reflector target position and reflector intended position.

A method for aligning heliostats, in which use is made of photodetectors that are arranged in a frame-like manner around an energetic aperture, is known from US 2010/0252024 A1.

US 2011/0317876 A1 has disclosed a method for aligning heliostats, in which the reflection of a heliostat is initially directed to a first point and subsequently directed to a second, spatially different point. A target area, which comprises the first and the second point, is recorded by the camera during each positioning. The actual alignment of the reflector is determined from the comparison of the two recorded images.

This method is disadvantageous in that the brightness differences obtained by the positioning of the heliostat often cannot be ascertained or can only be ascertained inaccurately on the basis of the camera image, and so the calibration method is susceptible to errors.

SUMMARY

The present invention is therefore based on the object of improving the efficiency of the calibration methods known in advance.

This object is achieved by a calibration method for a group of reflectors for concentrating solar radiation onto a radiation receiver and by a calibration apparatus for a group of reflectors for concentrating solar radiation onto a radiation receiver having one or more features of the invention. Advantageous configurations are found below and in the claims.

The calibration apparatus according to the invention is preferably embodied to carry out the calibration method according to the invention, in particular a preferred embodiment thereof. The calibration method according to the invention is preferably embodied to be carried out by the calibration apparatus according to the invention, in particular a preferred embodiment thereof.

The calibration method according to the invention for a group of reflectors for concentrating solar radiation onto a radiation receiver comprises the following method steps:

In a method step A, the reflectors are aligned in order to at least partly impinge a calibration surface with solar radiation reflected by the reflectors. In a method step B, a change in the intensity distribution of the radiation incident on the calibration surface is produced by carrying out a movement pattern by each reflector in the group, wherein the movement pattern of each reflector differs in at least one specified movement pattern parameter contained in the group of frequency of movement, amplitude of movement, phase angle of movement, trajectory of the solar radiation, reflected by the reflector, within the calibration surface, from the movement pattern parameters of the other reflectors. In a method step C, picture element series are recorded for a plurality of spatially different locations on the calibration surface by at least one camera, wherein each picture element series has at least five time-offset picture element frames.

The scope of the invention includes recording respectively one picture element series by a plurality of cameras. However, it is advantageous to record a plurality of picture series, in particular a multiplicity of picture series, by the camera.

In a method step D, a spectrum is ascertained for each picture element series by a transformation of the picture element series into frequency space. In a method step D, a spectra subset is assigned to the reflectors depending on the movement pattern parameter of the reflector. In a method step F, one or more reflector target positions are determined for each reflector depending on at least the spectra subset assigned to the reflector.

The calibration method according to the invention differs substantially from the method known in advance by virtue of a picture element series being recorded for each of the plurality of spatially different locations on the calibration surface and a spectrum being ascertained for each picture element series by transformation of the picture element series into the frequency space.

One or more reflection target positions for each reflector are determined depending on the analysis of the spectrum of the picture element series. This facilitates a substantially more detailed analysis of the camera frames, which is consequently less susceptible to errors, in comparison with the direct brightness comparison of two camera images.

This facilitates a more precise capture of the reflection target position of a reflector. Due to the high accuracy, it is likewise possible to capture reflection target positions of a plurality of reflectors that are moving at the same time, as a result of which the efficiency of the calibration method is significantly increased. Furthermore, the high accuracy also facilitates an evaluation in the case of smaller brightness differences in comparison with the methods known in advance, and so, for example, a calibration can be carried out with a calibration surface which is situated at least partly within, or preferably completely within, a receiver surface of the radiation receiver and which consequently has a high radiation intensity. Consequently, this facilitates a calibration during running operation, without energy losses occurring as a result of aligning a reflector to be calibrated onto a separate calibration surface. Even if a calibration surface that is separate from a receiver surface of the radiation receiver is used, the method according to the invention facilitates a performance increase since a faster calibration is possible due to the increased accuracy, and hence the radiation losses on the radiation receiver due to the calibration process are minimized.

The calibration apparatus according to the invention for a group of reflectors for concentrating solar radiation onto a radiation receiver comprises a group of reflectors comprising motor drives for positioning each reflector in order to concentrate solar radiation onto a radiation receiver and at least one camera and a calibration surface.

What is essential is that the calibration apparatus has a calibration unit, which is embodied to interact with the motor drives and the camera in order to carry out the following method steps:

A) aligning the reflectors by the motor drives in order to at least partly impinge the calibration surface with solar radiation reflected by the reflectors;

B) producing a change in the intensity distribution of the radiation incident on the calibration surface by carrying out a movement pattern by each reflector in the group, wherein the movement pattern of each reflector differs in at least one movement pattern parameter, specified by the calibration apparatus, contained in the group of
   frequency of movement,
   amplitude of movement,
   phase angle of movement,
   trajectory of the solar radiation, reflected by the reflector, within the calibration surface,
   from the movement pattern parameters of the other reflectors;

C) recording picture element series for a plurality of spatially different locations on the calibration surface by the camera, wherein each picture element series has at least five time-offset picture element frames;

D) ascertaining a spectrum for each picture element series by a transformation of the picture element series in the frequency space;

E) assigning a spectra subset to the reflectors depending on the movement pattern parameter of the reflector;

F) determining one or more reflection target positions for each reflector depending on at least the spectra subset assigned to the reflector.

As a result of this, the advantages described in relation to the method according to the invention arise.

As described at the outset, the method according to the invention also allows, as a result of the high accuracy, an evaluation of superposed changes in the intensity distribution on the calibration surface due to a plurality of initiated movements of the reflectors. Therefore, a plurality of reflectors from the group of reflectors are advantageously moved at the same time with the specified movement pattern parameters; in particular, all reflectors of the group of reflectors are preferably moved at the same time. Reflection target positions for each reflector can be extracted separately despite the superposed simultaneous movements due to the high precision, which is due, in particular, to ascertaining a spectrum for each picture element series by transformation of the picture element series into frequency space. Therefore, the group of reflectors preferably comprises at least 10 reflectors, preferably at least 100 reflectors.

Advantageously, the spectra are filtered in the calibration method and preferably filtered in respect of one or more specified frequencies. In particular, it is advantageous that filtering is implemented in a method step D1 between method steps D and E.

In the method according to the invention, the movement patterns of each reflector differ by at least one of the aforementioned movement pattern parameters. As explained below, a frequency can be typically assigned to the frequency pattern of each reflector. Consequently, filtering the spectrum in respect of this frequency facilitates a data reduction and a rejection of spectral components that are not initiated, or at least not decisively initiated, by the movement pattern. Even if several or all reflectors of the group of reflectors are assigned the same frequency due to the selected movement pattern parameter, such filtering is nevertheless advantageous to filter out signal or spectral components due to external disturbances.

In an advantageous embodiment, the spectrum of a reflector is filtered in respect of a frequency which corresponds to an excitation frequency of the reflector or which can at least be compared to an excitation frequency. Here, it is advantageous to undertake filtering in respect of the assigned excitation frequency and one or more integer multiples of the excitation frequency as components that are decisively initiated by the movement pattern at the excitation frequency are also typically still present in the frequency spectrum of an integer multiple of the excitation frequency. In particular, it is advantageous to undertake filtering in respect of the excitation frequency and twice the excitation frequency such that the result is a merging of the spectra of the excitation frequency and twice the excitation frequency.

In an advantageous embodiment, filtering is implemented in respect of a frequency range which surrounds the aforementioned filter frequency, in particular an excitation frequency. This is justified in that, due to, e.g., signaling or mechanical capacities in the frequency spectrum, the signals that are decisively initiated by the movement may be present at a slightly deviating frequency in comparison with a specified movement frequency, for example. Advantageously, filtering is implemented in a range which comprises +/−5% of the specified filter frequency, preferably +/−1% of the specified filter frequency as a deviation.

A preferred configuration of the method according to the invention that is particularly easily realizable and evaluable with a high accuracy emerges by virtue of each of the reflectors being moved periodically in order to obtain a periodic change in the intensity distribution on the calibration surface. Here, the frequency of the periodic movement can be assigned to each reflector in a simple manner, and so, particularly preferably, filtering can be carried out easily as described above. Moving all the reflectors or a subset of the reflectors with an identical frequency lies within the scope of the invention provided that the movement of these reflectors differs in at least one of the further aforementioned movement pattern parameters.

Each of the reflectors being moved periodically is particularly advantageous for the aforementioned reasons.

Advantageously, the reflectors are moved periodically in such a way that the periodic change in the intensity distribution of the calibration surface that is obtained by the movement of the reflectors lies in the frequency range of 0.001 Hz to 1 MHz, preferably in the range of 0.01 Hz to 100 Hz, in particular in the range of 0.1 Hz to 10 Hz. This is advantageous in that the motor—drives for aligning the reflectors according to the position of the sun can be used for establishing the movement and, preferably, no additional actuators are necessary to establish the movement.

Pulsed drive sequences are preferably used for producing the periodic movement of the reflectors. In particular, it is advantageous to transmit periodic drive pulses to the motor drives of the reflectors, said periodic drive pulses being matched to natural vibrations and/or elastic properties of the reflector, in particular of the overall system comprising the motor drives, the holder and the reflector, such as, e.g., foundations, pylon, frame, mirror facets, drives, gearing, controller. An advantage arising as a result of this is that the vibration behavior that is inherent to the individual reflector is exploited and excited such that excitation energy can be saved and mechanical loads can be kept low.

For data analysis with high precision, it is advantageous for each picture element series in each case to have a plurality of frames for a plurality of periods of the periodic change. In particular, it is advantageous for each picture element series to have at least 5 frames, preferably at least 10, in particular at least 20 frames per period. Provided that the movements have different period durations, it is advantageous that each picture element series has at least 5 frames, preferably at least 10, in particular at least 20 frames per period in the case of all movements, in particular in the case of the movement with the shortest period.

In order to obtain a high precision, it is advantageous for a picture element series to have at least 5 frames, preferably at least 50, in particular at least 100 frames.

In order to obtain a high precision and a high evaluation speed, it is advantageous for a picture element series to be recorded with a recording frequency of greater than one frame per second (fps), preferably greater than 20 fps, in particular greater than 30 fps.

In a preferred manifestation, the reflector movement frequencies are chosen by the frequency-of-movement movement pattern parameter in such a way that they occur as integer factors of the measurement series length (number of pictures) over the observation time interval. In particular, choosing integer factors that are not multiples of one another, preferably prime factors, is advantageous. In this way, a coverage of the frequency signals as a multiple of one another is avoided.

Advantageously, method step A comprises the tracking of the reflectors in order to compensate a relative movement of the sun such that the calibration surface is always at least partly impinged as a result of said tracking of the reflectors, even in the case of a changing position of the sun. Advantageously, tracking is implemented in such a way that the sunlight reflected by the reflectors is reflected completely within the calibration surface. Consequently, the alignment of the reflectors preferably comprises the tracking of the reflectors in respect of the changing position of the sun.

In addition to the aligning and preferred tracking of the reflectors, a movement pattern is impressed on the group of reflectors by the motor drives according to method step B, said movement pattern being characterized by the movement pattern parameters. The movement pattern parameters of the reflectors differing in respect of a plurality of movement pattern parameters of the group of the aforementioned movement pattern parameters lies within the scope of the invention. Preferably, the movement patterns of all reflectors of the group of reflectors differ in at least one common movement pattern parameter, preferably in exactly one common movement pattern parameter. This simplifies the evaluation and analysis of the reflection target position and of the reflectors.

Recording picture element series for a plurality of spatially different locations on the calibration surface by at least one camera can be advantageously implemented using a camera known per se, in particular a digital camera, preferably an HDR (high dynamic range) camera. The use of a sCMOS (scientific CMOS) camera was found to be particularly advantageous. The use of CCD cameras is likewise possible.

It lies within the scope of the invention to use only a subset of the image pixels of the camera for recording and evaluating picture element series. Preferably, all image pixels that correspond to a location on the calibration surface are used for recording picture element series. Preferably, picture element series are recorded for at least 100, preferably at least 1000, particularly preferably at least 10 000 spatially different locations on the calibration surface in order to obtain a high spatial resolution. The picture elements are preferably arranged on the crossing points of a rectangular grid, particularly preferably a square grid. In order to obtain a high resolution, it is particularly advantageous for the picture elements on the calibration surface to be arranged with a density of at least 100 picture elements per square meter, preferably at least 1000, particularly at least 10 000 picture elements per square meter.

In method step D, a spectrum for each picture element series is ascertained by a Fourier transform, particularly preferably by a discrete Fourier transform. As a result of this, it is possible to resort to mathematical methods known per se, in particular to the discrete Fourier transform. Likewise, other methods for ascertaining a spectrum for each picture element series by transforming the picture element series into the frequency space, such as the Laplace transform and cosine transform, lie within the scope of the invention.

Assigning a spectra subset to the reflectors depending on the movement pattern parameter of the reflector can be implemented in different ways, as described in more detail below. An assignment is particularly preferably implemented on the basis of one of the frequency-of-movement, amplitude-of-movement or phase-angle-of-movement movement pattern parameters. These facilitate a particularly robust analysis that is not susceptible to errors.

The motor drives for setting the alignment of the reflector and carrying out the movement pattern and, optionally, for tracking the reflector can be embodied in a manner known per se. In particular, the motor drives can be embodied for two-axis movement of the reflector, particularly preferably in solar tower applications. The motor drives being designed for single-axis movement of the reflector, particularly when using linear collectors with linear radiation receivers, also lies within the scope of the invention. The calibration unit can be embodied in a manner known per se as a computer. In particular, both a tracking unit, for tracking the reflectors in respect of the changing position of the sun, and the calibration apparatus are preferably embodied in a common computer unit. The control commands of the calibration apparatus to the motor drives of the reflectors can be implemented in a manner known per se, in particular by a wired link or by the radio link. However, the calibration unit can also be embodied as an independent unit, which communicates with the tracking unit via an interface.

In method step F, the at least one reflection target position is determined for each reflector. The latter is preferably compared to a reflection intended position for each reflector in order to ascertain a possible deviation, which is used to correct the actuation of this reflector in order to eliminate the deviation. Here, in a manner known per se, a conversion of a possible location deviation of a reflection target position on the calibration surface to a reflection intended position on the calibration surface is converted into corresponding parameters of the motor drives of the reflector, such as actuating angle, for example.

As mentioned at the outset, due to the high precision of the method according to the invention, it is possible to detect the local intensity change on the calibration surface affected by the impressed movement patterns of the individual reflectors even in the case of a high overall intensity of the radiation incident on the calibration surface. Advantageously, the calibration surface therefore at least partly covers an energetic aperture of the radiation receiver. As a result, a calibration can be implemented during running operation, i.e., while the target point of the reflector lies within an energetic aperture of the radiation receiver. In particular, it is therefore advantageous for the calibration surface to completely cover the energetic aperture of the radiation receiver. It is particularly advantageous for the calibration surface to completely cover the energetic aperture of the radiation receiver and, additionally, an edge region, preferably a circumferential edge region, of the energetic aperture.

In a further advantageous embodiment, the calibration surface covers the edge of an energetic aperture of the radiation receiver. This is particularly advantageous if radiation that is reflected onto the energetic aperture by the reflector is not incident, or only incident to a small extent, on an image detector of the camera from the energetic aperture. This may be due to the absorption of the energetic aperture. Likewise, this may be due to the viewing angle of the camera and an aperture, recessed by structural elements such as frame and holders, for the camera covering the receiver surface of the radiation receiver. In an advantageous embodiment, picture element series are consequently recorded at least partly, or preferably exclusively, on the edge of the energetic aperture of the receiver in method step C. Here, it is particularly advantageous if the picture element series extend in circumferential fashion about the energetic aperture of the radiation receiver, particularly if the calibration surface forms a circumferential frame around the energetic aperture. Consequently, it is necessary in these cases for the movement patterns to be designed in such a way that the reflections of the reflectors at least partly overlap the edge of the energetic aperture. However, due to the high precision of the present method, it is also possible to already undertake an accurate analysis of the reflection target position on the edge of the calibration surface even in the case of only a short-term overlap, such that only a small energy loss occurs.

Advantageously, a brightness amplitude image is produced in method step E. To this end, filtering of the spectra values at a filter frequency or, as described above, preferably in the region of a filter frequency is preferably carried out. As likewise described above, it is particularly advantageous to specify a list of filter frequencies, particularly preferably a list of filter frequency ranges, with filtering being implemented for each entry of the list and the results being merged, for example via addition. There is filtering by one or more filter frequencies for each spectrum for the purposes of producing the brightness amplitude image. Each filtering yields a real and imaginary component of the frequency signal for each spectrum. The absolute value of this complex number is extracted to the brightness amplitude for this spectrum filtered at this frequency.

The brightness amplitudes ascertained during each filtering are preferably added when filtering the spectrum at a plurality of frequencies, particularly preferably at an initial frequency and at twice the initial frequency.

As a result, a brightness amplitude image is obtained, said brightness amplitude image having a brightness amplitude, ascertained as described above, for each location of the spectrum on the calibration surface.

The assignment of a spectra subset to the reflectors depending on the movement pattern parameter of the reflector is preferably implemented on the basis of the brightness amplitude image as described above.

In an advantageous configuration of the calibration apparatus according to the invention, the calibration surface has a diffusely reflecting surface. An advantage arising herefrom is that a sufficient intensity, which facilitates a measurement, is scattered at least in the region of the diffusely reflecting surface in the direction of the camera, even from a camera viewing angle that does not correspond to the position of the reflectors. As explained previously, the calibration surface preferably covers the edge of an energetic aperture of the radiation receiver for the solar radiation; particularly preferably, the calibration surface covers this edge in circumferential fashion. It is particularly advantageous for the calibration surface to form a frame around the energetic aperture. This advantageous configuration is preferably used in the case of linear collectors, particularly in the case of linear collectors in which the solar radiation is reflected onto the linear receiver via a primary reflector (to be calibrated) and a (typically stationary) secondary reflector. Here, the diffusely reflecting surface is preferably formed on, or within the area of, the secondary reflector aperture.

Advantageously, the apparatus comprises a plurality of cameras which are arranged at different recording angles in relation to the calibration surface. This is particularly advantageous in the case of non-planar calibration surfaces, for example calibration surfaces that cover a non-planar receiver surface of a radiation receiver, such as the receiver surface of a cylindrical receiver, for example. Advantageously, the calibration apparatus is embodied for recording picture element series for a multiplicity of spatially different locations of the calibration surface by the camera, wherein each picture element series has at least five time-offset picture element frames.

The picture element series preferably have the same spacing in time; i.e., the picture element series are preferably temporally equidistant.

BRIEF DESCRIPTION OF THE DRAWINGS

Further advantageous embodiments of the method according to the invention and the apparatus according to the invention are described below on the basis of the figures and on the basis of exemplary embodiments. Here.

DETAILED DESCRIPTION

All figures are schematic illustrations that are not true to scale. In the figures, the same reference signs denote the same elements or elements with the same effect.

Figure 1:
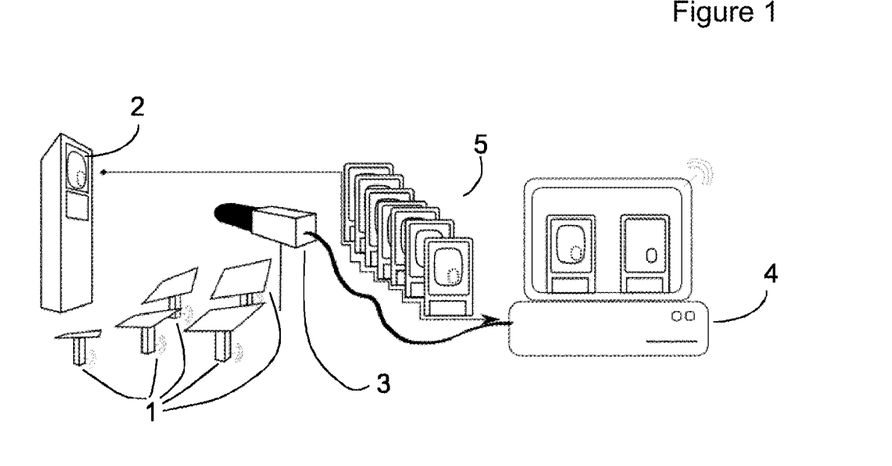
FIG. 1 shows a first exemplary embodiment of an apparatus according to the invention.

FIG. 1 shows a first exemplary embodiment of a calibration apparatus according to the invention. The calibration apparatus comprises a group of reflectors 1, which are mounted on pylons in a manner swivelable about two axes by motor drives. The reflectors 1 are embodied as heliostats. The apparatus furthermore comprises a radiation receiver 2, which is arranged on a tower and which has a rectangular radiation aperture. Within the rectangular radiation aperture, the radiation receiver has an absorber that completely fills the radiation aperture, the absorber surface of said absorber being connected in thermally conductive fashion to conduits for a heat transport fluid.

The heat that is obtained by concentrating sunlight on the radiation receiver 2 by the reflectors 1 is dissipated for further use, for obtaining power in an energy cycle in the present case, by the heat transport fluid. Furthermore, the calibration apparatus comprises a camera 3, which is embodied in the present case as a digital camera for the spatially resolved recording of measurement images of the calibration surface, which completely covers the absorber surface of the radiation receiver 2. The camera 3 has a resolution of 2048×2040 pixels.

Furthermore, the calibration apparatus has a calibration unit 4, which is embodied as a computer in the present case. The calibration unit 4 is connected to the camera 3 by way of a data cable, in order, firstly, to control the recordings of the camera 3 and, secondly, to receive the measurement images of the camera 3.

Furthermore, the calibration unit 4 is connected via radio to the motor drives for positioning the reflectors 1.

The calibration unit 4 is embodied, firstly, to update the reflectors 1 to a changing position of the sun as a tracking unit such that the sunlight is concentrated on the radiation receiver 2 at all times and independently of the position of the sun. Secondly, the calibration unit 4 is embodied to embody the following method steps:

According to method step A, the reflectors 1 are aligned by the aforementioned motor drives in order to impinge the calibration surface, which is identical to the absorber surface of the radiation receiver 2 in the present case, with solar radiation reflected by the reflectors.

In a method step B, a change in the intensity distribution of the radiation incident on the calibration surface is produced by the calibration unit 4 by way of each reflector 1 carrying out a movement pattern. Here, the movement pattern of each reflector is specified by the calibration unit 4 by control signals for the motor drives of the reflectors 1 and the movement pattern of each reflector differs in at least one movement pattern parameter, specified by the calibration apparatus, from the group containing frequency of movement, amplitude of movement, phase angle of movement, and trajectory of the solar radiation, reflected by the reflector, within the calibration surface.

The camera 3 is used to record picture elements for a plurality of spatially different locations on the calibration surface, with a sampling rate of 25 Hz in the present case.

Each picture element series is recorded over a time duration of 5.12 s, and so each picture element series contains approximately 128 picture element frames. The result is illustrated schematically as a measurement image series 5, which shows a plurality of time-offset recordings by the camera 3 of the calibration field, lying successively in space in a schematic fashion.

Consequently, a picture element series is available for each picture element of each measurement image, said picture element series consisting of the time-offset recordings of this picture element. All picture elements at a given time yield a measurement image and all picture element series together yield the measurement image series 5.

In a method step D, a spectrum is ascertained for each picture element series by a transformation of the picture element series into frequency space, by a discrete Fourier transform by way of the calibration unit 4 in the present case.

In a method step E, a spectra subset is assigned to the reflectors depending on the movement pattern parameter of the reflector and, in a method step F, one or more reflection target positions are determined for each reflector depending on at least the spectra subset assigned to the reflector. The reflection target positions are compared to the predetermined intended positions for each reflector 1 and a deviation is established by the calibration unit 4 from a possible spatial difference of these positions for the purposes of correcting the actuation of the reflectors. All of these steps are likewise implemented by the calibration unit 4.

The use of the aforementioned movement pattern parameters will be explained in more detail below on the basis of embodiments and exemplary embodiments of the method according to the invention. The explanations are implemented in exemplary fashion using the exemplary embodiment, illustrated in FIG. 1, of an apparatus according to the invention:

Advantageously, in the method according to the invention, a different frequency is specified as a movement pattern parameter for each reflector and a spectra subset, which comprises at least the spectra of that frequency, which correspond to the movement pattern parameter of the reflector, is assigned to each reflector. Advantageously, the spectra which comprise the spectrum of that frequency, which corresponds to the movement pattern parameter of the reflector, is assigned to each reflector or a spectra subset, which comprise the spectra of that frequency, which correspond to the movement pattern parameter of the reflector, is assigned to each reflector. In particular, a spectra subset, which comprise the spectra of that frequency, which correspond to the movement pattern parameter of the reflector and comprise the spectra of at least an integer multiple frequency of the frequency that corresponds to the movement pattern parameter of the reflector, in particular the double frequency, is preferably assigned to each reflector.

Preferably, the spectra are assigned here by filtering by virtue of filtering all spectra being carried out at the aforementioned frequency or frequencies. Subsequently, the filtered spectra are selected on the basis of a selection criterion. This may be the specification of a threshold, with only those spectra that have a value greater than the specified threshold being selected. The selected spectra are assigned to the reflector. Consequently, an assignment was carried out in such a way that filtering of all spectra is undertaken as the frequency of movement as a movement pattern parameter (optionally in an extended form as the frequency range due to un-sharpness and, where necessary, at integer multiples of this frequency, in particular at twice frequency, too), said filtering consequently being specific to the individual frequency of the reflector as a movement pattern parameter. A subset of the filtered spectra is formed by way of the selection criterion. This is preferably implemented by virtue of a brightness amplitude being formed for the filtered spectrum, in particular by combining the real and imaginary part of the frequency signal of the filtered spectrum. Consequently, a threshold for the brightness amplitude can preferably be specified as a selection criterion, and so only those spectra whose brightness amplitude is greater than the predetermined threshold are assigned to this reflector.

After carrying out these steps of filtering (for creating the brightness amplitude image) and assigning a spectra subset depending on a criterion, in particular a threshold for the brightness amplitude for each reflector, the reflectors are consequently assigned to typically different spectral subsets—due to the different frequencies as movement pattern parameters.

The spectra subset assigned to each reflector can be represented by a brightness amplitude image by virtue of a significant value—such as 1, for example—being entered at each location of the spectrum, i.e., at the location on the calibration surface, at which the picture element series was recorded for this spectrum, whereas a value deviating therefrom—such as 0, for example—is recorded at the locations of those spectra that do not meet the selection criterion. A mean position of the impressed periodic movement of each reflector can be determined from the areas arising hereby (which are formed by the values quantified as 1), for example by forming a centroid of an area. Consequently, this mean position represents a reflection target position, which was ascertained for each reflector.

This reflection target position can be compared to the reflection intended position for each reflector i.e., that location of the calibration surface which corresponds to the centroid of an area according to the present evaluation on the basis of the movement positions specified by the calibration apparatus. A comparison between the reflection intended position and the reflection target position facilitates the determination of a deviation, which is used to correct the actuation.

Figure 2A:
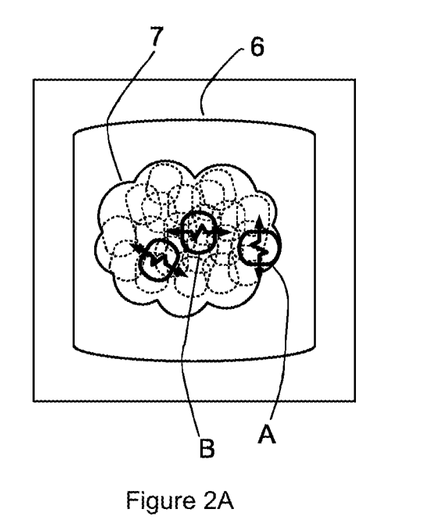
FIGS. 2A and 2B show schematic illustrations of a calibration surface for explaining the frequency and amplitude movement pattern parameters.
Figure 2B:
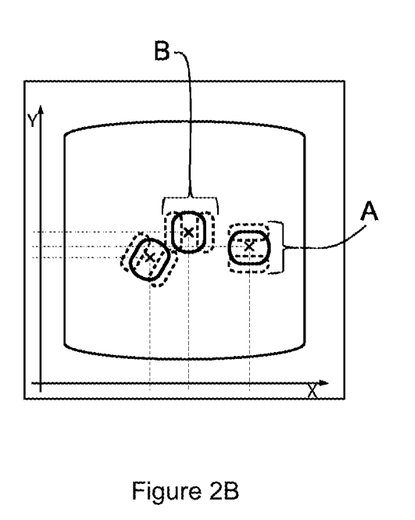

An exemplary embodiment of a method according to the invention, in which the movement patterns of the reflectors differ by the frequency movement pattern parameter, is explained on the basis of the schematic illustrations illustrated in FIGS. 2A and 2B. FIG. 2A shows the schematic representation of the calibration surface 6. Situated thereon is a superposition 7, surrounded in cloud-like fashion, of the sunlight reflections by the individual reflectors 1. For a better overview, only individual reflections are illustrated in a manner surrounded by dashed lines. In this exemplary embodiment, periodic movements are impressed simultaneously onto the reflectors 1 by the calibration unit 3, said movements having an identical amplitude and phase angle of the movement, but different frequencies. In exemplary fashion, the reflection A of a first reflector 1 moves upward and downward along the arrow tips on the calibration surface 6 with a specified frequency fA due to this impressed movement. Accordingly, the reflection B of a second reflector 1 moves left and right along the arrow tips on the calibration surface 6 with a specified frequency fB, said frequency fB differing from fA. Phase and amplitude of both movements are the same.

Now, a measurement image series 5 is recorded by the camera 3, consequently yielding a multiplicity of picture element series. Each picture element series is transformed into frequency space by a discrete Fourier transform, and so a spectrum arises for each picture element series. Now, in a first step, each spectrum is filtered with the frequency fA such that only those components of the spectrum that correspond to the movement pattern parameter of the first reflector remain. Subsequently, a brightness amplitude image is produced for these spectra that were filtered with the frequency fA. Each filtered spectrum has a real and an imaginary part of the frequency signal. The absolute value of this complex number is combined to form the brightness amplitude for this spectrum.

As a result, a brightness amplitude image consequently emerges, which, as described previously, has a certain brightness amplitude at the location of the calibration surface 6 at which a picture element series was recorded. Subsequently, a brightness amplitude image is created by virtue of, above a specified threshold, only those picture elements that have a brightness amplitude that is greater than the specified threshold being illustrated so as to be bright. All other points are illustrated so as to be dark. The threshold is ascertained as follows: the signal-to-noise ratio is ascertained, for example by a comparison with recording series without periodic movement or by ascertaining the signal-to-noise ratio from the measurement series using signal processing methods. A safety margin in relation to the noise level is preferably chosen, such as, once again, the absolute value of the noise level. The noise level and the safety margin are added and used as the threshold. Other methods for determining a signal relevance, which are known from signal processing, may likewise be used.

The picture elements illustrated so as to be bright consequently correspond to the assignment of a spectra subset to the first reflector.

In FIGS. 2A and 2B, the arising surfaces are represented by dashed lines. For reasons of simplicity, all bright surfaces arising for the three separately labeled reflectors are represented by dashed lines in one image. As may be identified, for example, using the two dashed areas in the region of the position denoted by A, the dashed areas represent the vertices of the impressed periodic movement. Consequently, the location denoted by "x", which corresponds to the mean position of the impressed movement, can be ascertained by way of forming a centroid of an area. This is independent of the alignment of the movement, as is shown, for example, by the result of a similar analysis at the position B for the second reflector.

The position marked by "x" in region A and in region B consequently represents the target reflection position for the first and the second reflector (which corresponds to the movement center in the present case). The intended reflection position is likewise known since the movement specified by the calibration unit 4 was specified by way of intended positions. Accordingly, the intended movement center can also be calculated easily on the basis of the specified data as an intended reflection position or the intended reflection position is directly available as an input parameter.

As described above, a comparison of these two positions yields the deviation for the respective reflector.

In a further advantageous embodiment of the method according to the invention, a different amplitude is specified for each reflector as movement pattern parameter. A movement amplitude is determined for the spectra of at least a spectra selection of the spectra and a spectra subset of the spectra selection is assigned to each reflector, said spectra subset having a movement amplitude, which corresponds to the amplitude movement pattern parameter of the reflector.

It lies within the scope of the invention to use all spectra for determining the movement amplitude. However, it is advantageous that a spectra selection is determined for each reflector, which spectra selection comprises at least the spectrum with the frequency of the movement of the reflector. Consequently, in this advantageous embodiment, the spectra are initially restricted by way of the frequency underlying the movement pattern of the reflector, and so signal components that are not initiated by the movement of this reflector are already precluded.

One exemplary embodiment for such a preferred embodiment, in which a different amplitude is specified as a movement pattern parameter for each reflector, is explained below, likewise on the basis of FIGS. 2A and 2B.

In this second exemplary embodiment, a periodic movement is impressed in substantially the same way as already described above in the case of the first exemplary embodiment. However, the periodic movement of all reflectors is implemented at the same frequency, but with different amplitudes in this exemplary embodiment.

In this second exemplary embodiment, too, there is filtering of the spectra on the basis of the excitation frequency and a creation of a brightness amplitude image by specifying a threshold which, in the present case, is ascertained by an analysis of the signal-to-noise ratio, as was already the case previously in the first exemplary embodiment. The result corresponds to the schematic representation according to FIG. 2B, wherein, however, assigned dashed areas in region A have a different spacing than the dashed areas assigned to region B. This is because, as explained previously, the dashed areas represent the vertices of the periodic movement. Consequently, due to the different amplitudes, the vertices of the areas according to region A assigned to the reflector 1 lie at a different distance from one another in relation to the dashed areas according to region B, which are assigned to the second reflector.

The assignment of these areas to the individual reflectors can be implemented in different ways: thus, a centroid of an area of the contiguous areas, i.e., all of the areas represented by a dashed outline in FIGS. 2A and 2B, can be formed. Distances are ascertained between these centroids of an area and a comparison of these distances with the predetermined amplitudes facilitates an assignment of respectively two areas, corresponding to a vertex, to a reflector.

Once respectively two vertex areas represented in outlined fashion have been assigned to respectively one reflector, it is possible, as described in the first exemplary embodiment, to ascertain a movement center by forming a centroid of an area, which movement center consequently represents the target reflection position of the respective reflector. As described above, this can be compared to an intended reflection position of the respective reflector for the purposes of ascertaining a deviation.

Figure 3A:
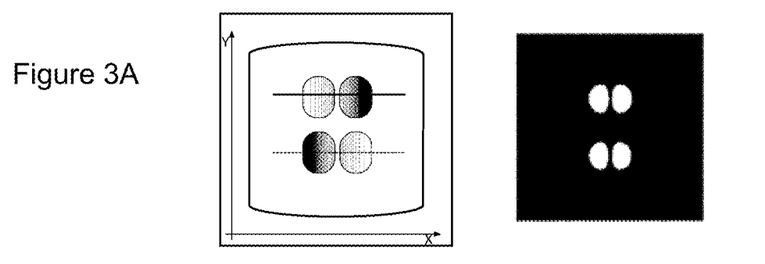
FIGS. 3A and 3B show illustrations for explaining the phase angle movement pattern parameter.
Figure 3B:
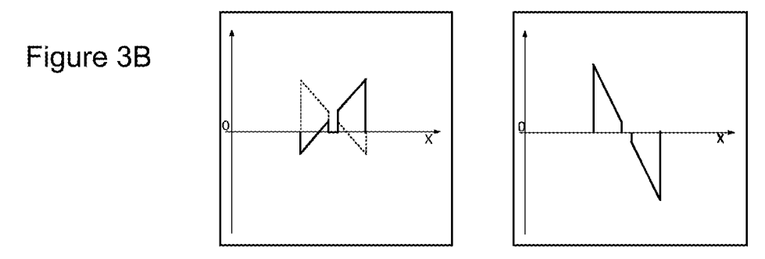

A further exemplary embodiment of a method according to the invention, in which the movement patterns of the reflectors differ by the phase-angle movement pattern parameter is explained on the basis of the data illustrated in FIGS. 3A and 3B. This exemplary embodiment is also carried out using the apparatus illustrated in FIG. 1. Carrying this out is implemented in a manner similar to the exemplary embodiment described above, in which the movement patterns of the reflectors differ in terms of the frequency movement pattern parameter. Therefore, in order to avoid repetition, it is substantially the differences that are discussed below:

In this exemplary embodiment, too, a periodic movement is impressed in all reflectors of the group of reflectors, as explained in relation to FIGS. 2A and 2B. However, the movements of all reflectors have the same frequency and the same amplitude in this exemplary embodiment. However, a different excitation phase angle is specified for the reflectors.

Consequently, method steps A and B are carried out in this exemplary embodiment substantially as described above, with the difference that frequency and amplitude of the movement of the group of reflectors are the same, but the phase angles of the movement of the reflectors differ in pair-wise fashion.

The picture element series are likewise recorded as described above in relation to method step C. Ascertaining a spectrum for each picture element series by a transformation of the picture element series into frequency space in a method step D is also implemented as explained above.

For the purposes of cleaning the data records from external influences, it is advantageous to filter the spectra of the reflectors in respect of the specified excitation frequency, as described above. However, in contrast to the filtering described above, the spectrum is filtered with the same frequency in the case of all reflectors in this exemplary embodiment since all reflectors also have an identical excitation frequency in this exemplary embodiment. The filtering in respect of the excitation frequency therefore does not serve the assignment of the spectra to the individual reflectors in this exemplary embodiment, but to clean and simplify the data record for further processing.

After carrying out the frequency filtering, a phase angle is determined for each picture element series. In the present exemplary embodiment, this is implemented as follows: a real and an imaginary part are obtained for each picture element series from the above-described Fourier transform. Only the positive half or only the negative half of the imaginary part is included in the evaluation; it is the positive half in the present case. By contrast, both manifestations, the positive and also the negative manifestation, of the frequencies are used in the real part. The inverse transformation of these data yields the brightness curve for each picture element series with half the amplitude, with the brightness curve being available as a complex number. From this, a phase angle is formed for each picture element series: this can be implemented using the arctangent of the quotient of the complex sequence of numbers of the picture element series. By observing the sign of the real and imaginary part, the phase is ascertained in the range of $\pm\pi$.

As a result, a phase angle is available for each picture element series.

Furthermore, a brightness amplitude image is determined, as described above.

A phase angle image is produced from the phase angle values and the brightness amplitude image. This can be implemented by virtue of a certain recording point being selected for each picture element series. In the present case, the time of the first frame is chosen. A phase angle image is present as a result. This phase angle image is filtered further, by multiplication with the brightness amplitude image in the present case.

As a result, a phase angle image was created, which only has the phase responses of the decisive points, the phase responses of the vertices of the periodic movements in the present case.

FIGS. 3A and 3B illustrate exemplary results of the evaluation, which is based on two non-overlapping movements, which are shifted by 0.25 periods. Consequently, the one movement in this example has a phase angle of $1\pi$ in relation to the other movement (e.g., movements A and B according to FIG. 2A.

In partial image b, a section through the two phase responses is illustrated on the right for the purposes of elucidating the value curve, with the curve with the greater maximum being assigned to the movement A and the curve with the smaller maximum being assigned to the movement B in the present case. The values are situated in the range of $-\pi$ to $\pi$, corresponding to the phase of the sinusoidally transformed brightness profile.

The difference of these two sections is illustrated in the right-hand partial image of FIG. 3B.

Now, in a method step E, a spectra subset is assigned to the reflectors depending on the phase movement pattern parameter in the present case, as follows:

Contiguous regions about the vertex position are defined in the brightness amplitude image by forming areas. Here, an area assignment can be implemented by forming a threshold, as described above, for example like the two white areas in the brightness amplitude image according to FIG. 3A, right. In an advantageous development of the exemplary embodiment, the entire covered area of the movement can be used in the case of the additional consideration of multiples of the excitation frequency—as described above.

The curve of the phase angle in the contiguous regions differs according to the phase offset. A common phase response is formed if the movements overlap.

The phase responses are correlated with the specified excitation phase angle of each reflector, and so a phase response can be assigned to a reflector in each case.

In the example illustrated in FIGS. 3A and 3B, this is implemented as follows: the phase image in partial image a), left (for an improved representability, the phase values are only presented in the outlined areas, once in a point density representation and once as elevations), is discretely differentiated. As a result of this, the gradient direction and the gradient magnitude of the phase response are ascertained. Related phase responses from partly delimited areas (the areas around the vertices belonging together) are identified by restricting the value range of the discretely differentiated phase image. Since the phase response is continuous, the value range of the differential likewise remains continuous. The partial image b), left, in each case represents a section through the phase response of the two occurring movement patterns: the dotted line shows the section along the dotted line in the partial image a), left; the full line shows the section along the full line in partial image a), left. A phase response (dotted line) exhibits a negative gradient in this case. Therefore, the differential image exhibits negative values for this movement pattern. The second section (full line) exhibits a positive gradient. Accordingly, the differential exhibits positive values therefore. In this case, the assignment of the belonging of the areas is merely implemented by distinguishing positive/negative.

In an alternative embodiment, it is also possible to merely compare the ratios or differences of the phase responses of different regions with the conditions of the predetermined phases in order to carry out an assignment. To this end, FIG. 3B illustrates such a difference between the dotted and the full line of the right image.

From these identified areas that belong together, the target reflector point is formed as mean centroid of the areas in a manner analogous to the description above. The assignment of the target reflector point to the reflectors is ascertained on the basis of the phase response around the target reflector points: the phase angle around the target reflector point, and at the vertices, is determined from the input parameters. The phase angle from the phase image at these positions is correlated to the known references and so the assignment of the different target reflector points to the reflectors is obtained.

A further exemplary embodiment of a method according to the invention is explained below on the basis of the illustrations according to FIGS. 4A, 4B, and 4C; here, the movement pattern parameters of the reflector differ in terms of the trajectory of the solar radiation, reflected by the reflector, within the calibration surface.

Figures 4A, 4B:
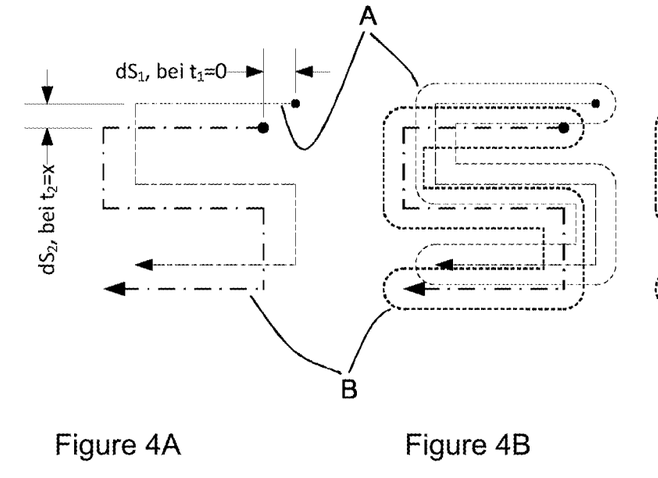
FIGS. 4A, 4B, and 4C show schematic illustrations for explaining the trajectory movement pattern parameter.

As illustrated in exemplary fashion in FIG. 4A, S-shaped trajectories are respectively specified for reflectors A and B, and so the intended reflector positions of the reflectors on the calibration surface move according to the lines illustrated in FIG. 4A. Consequently, the predetermined trajectories have an offset $dS_1$ in the X-direction and $dS_2$ in the Y-direction. In terms of their manifestation in relation to area, the trajectories are chosen in such a way that the trajectories of the two reflector images overlap, as illustrated in FIG. 4B. The speed is chosen in such a way that the overlap occurs within the chosen observation time period, i.e., while recording the picture element series.

Method steps A and B are consequently carried out as described above, wherein, in method step B, different trajectories of the solar radiation, reflected by the reflector, are specified within the calibration surface for each reflector of the group of reflectors. Method step C for recording picture element series is likewise implemented as described above.

Likewise, a spectrum is carried out for each picture element series by the transformation of the picture element series into frequency space, as described above, in method step D.

Brightness amplitude images are formed from the spectra, as described above. For the further analysis, the overall number of the brightness amplitude images, i.e., over the entire frequency spectrum, is used.

Overlap forms in the set of brightness amplitude images are ascertained by forming areas and image processing methods so as to ascertain overlaps between the movement patterns. Here, the following relationships, for example, can be exploited:

Certain overlap forms may occur in the individual brightness amplitude spectra for different frequencies depending on the start positions of the movement patterns (i.e., the start positions of the trajectories of the solar radiation, reflected by the respective reflector, within the calibration surface). The frequency with which such an overlap form occurs depends on the factors of speed and distance of the movement of the solar radiation, reflected by the respective reflector, within the calibration surface. Consequently, the speed, too, is known from the specified movement or it can be calculated from the parameters of the specified movement. The distance can be determined from the occurrence of the overlap forms: here, a frequency f at a location within the calibration surface assigned to a picture series specifies how great the distance of the movement curves of the images is. The distance may differ for different movement directions, and so the distance can be determined in two-dimensional form.

The sequence of the superposition, the extent of the superposition and/or the spatial curve of the superposition is ascertained by way of the position, form and frequency in which trajectory artifacts have been ascertained. On the basis of these trajectories and in comparison with the specified trajectories, the individual movement pattern of each reflector is tracked and the target position is determined therefrom.

Subsequently, as described above, a possible deviation can be determined by comparing the target position and the intended position.

Figure 4C:
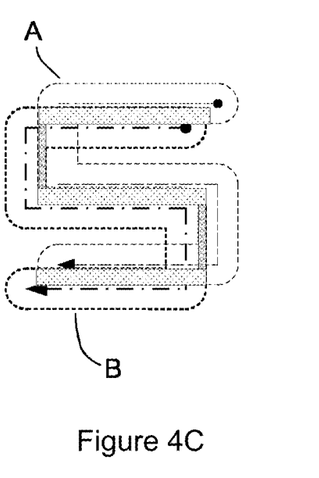

FIG. 4 illustrates an example of two such offset trajectories: as already described, partial image 4a) shows the offset $dS_1$ in the X-direction of the two specified trajectories and $dS_2$ shows the offset in the Y-direction thereof. The image of the solar radiation reflected by the reflectors is not, however, punctiform but represents an area, which approximately reproduces the image of the reflector area. Accordingly, the trajectory within the calibration surface also has an areal extent. This is illustrated in FIG. 4B by the dashed outline of the trajectories. It is evident herefrom that there is a partial overlap of the images. These overlaps are labeled in FIGS. 4A, 4B, and 4C as dotted regions.

In the situation illustrated in FIGS. 4A, 4B, and 4C, both movements A and B start at a time $t_1=0$. The trajectory of the movement B is shifted by $dS_1$ in the direction of travel (horizontally to the left in the present case according to the illustrations in FIG. 4A. The period width of the vibration of the brightness periods of the on the calibration surface, which arises in the case of the superposition of the subsequent trajectories, consequently corresponds to the product of the offset $dS_1$ and the speed at which the images of the two reflectors move (under the assumption of a common speed). Accordingly, the frequency of the brightness change emerges from the inverse of the brightness period. This can be converted into the frequency of the recorded data record by way of the recording frequency of the camera.

The brightness period produced on the calibration surface changes when the movement alternates in the vertical direction, where there is a change in the local offset to $dS_2$, which is different from $dS_1$ in the present case, although the speed remains unchanged. Consequently, these regions are imaged at a different frequency. The superposition of the extended images and the regions of the same frequency are, as described above, illustrated in exemplary fashion in FIG. 4B and FIG. 4C.

Consequently, for the purposes of representing the complete movement form, artifacts of the overall form are sought-after in the various brightness amplitude images, like possibly horizontal or else vertical lines in this example, which arise from the overlay. Tools from image processing, such as HOG (histogram of oriented gradients) transformations or Hough transforms, for example, or other identification algorithms for features, can be used for determining the complete movement form.

The assignment of the paths illustrated in FIGS. 4A, 4B, and 4C to the respective reflector is implemented by carrying out the process once again, this time with a slight displacement of the start point of one of the reflectors. The offset reflector is ascertained by the newly ascertained path curves. Consequently, the path curves of both reflector images and their current position are known.

In an alternative embodiment, the movement speeds of individual portions of the movement of one reflector differ from one another. As a result thereof, a plurality of offsets $dS_x$ are caused. Accordingly, the movement pattern is formed from a multiplicity of amplitude images with different frequencies. The change of the ascertained offsets $dS_x$ specifies which of the two paths can be assigned to which of the reflectors.

In an alternative exemplary embodiment, different forms, preferably different closed trajectories, are specified for the trajectories of the reflectors. In this exemplary embodiment, periodic movements are consequently specified for each reflector of the group of reflectors, said periodic movements however differing in respect of the form of the trajectory. By way of example, a trajectory A in the form of a circle can be specified for a first reflector and a trajectory B in the form of a rectangle can be specified for a second reflector. Preferred trajectories are simple, closed geometric forms such as a circle, rectangle, triangle, figure of eight or square, for example. In a preferred development, the frequency of the amplitude image is chosen on the basis of the duration of the movement (the duration of a period corresponds to the inverse of the frequency). Consequently, filtering as described above on the basis of the aforementioned frequency is implemented in this case.

In respect of method steps A to C, the method is implemented as described above, with, however, the trajectories being specified as mentioned above in method step B.

A spectrum is likewise ascertained in method step D for each picture element series by a transformation of the picture element series into frequency space.

The assignment of a spectra subset to the reflectors depending, in the present case, on the trajectory movement pattern parameter in a method step E is implemented by image processing techniques in this exemplary embodiment. By way of example, this can be implemented by a Hough transform or feature extraction, by virtue of creating brightness amplitude images as described above and by virtue of searching for the specified excitation movement patterns (circle and rectangle in the present case) in the brightness amplitude image. Corresponding filter movement patterns in the brightness amplitude image are assigned to the corresponding reflector with the trajectory specified thus.

In a method step F, the target reflector position is determined on the basis of the movement pattern position on the calibration surface. This is implemented on the basis of the characteristic features of the selected trajectory. By way of example, these are the corners of the geometric form for a rectangle. The time, and hence the intended position, at which the reflector image passes through the characteristic point is known. The correction parameters are determined by way of the difference of the ascertained curve in relation to the intended curve. By way of example, characteristic points of other forms can be centers (circle, figure of eight), crossing points (figure of eight), etc.

Figure 5:
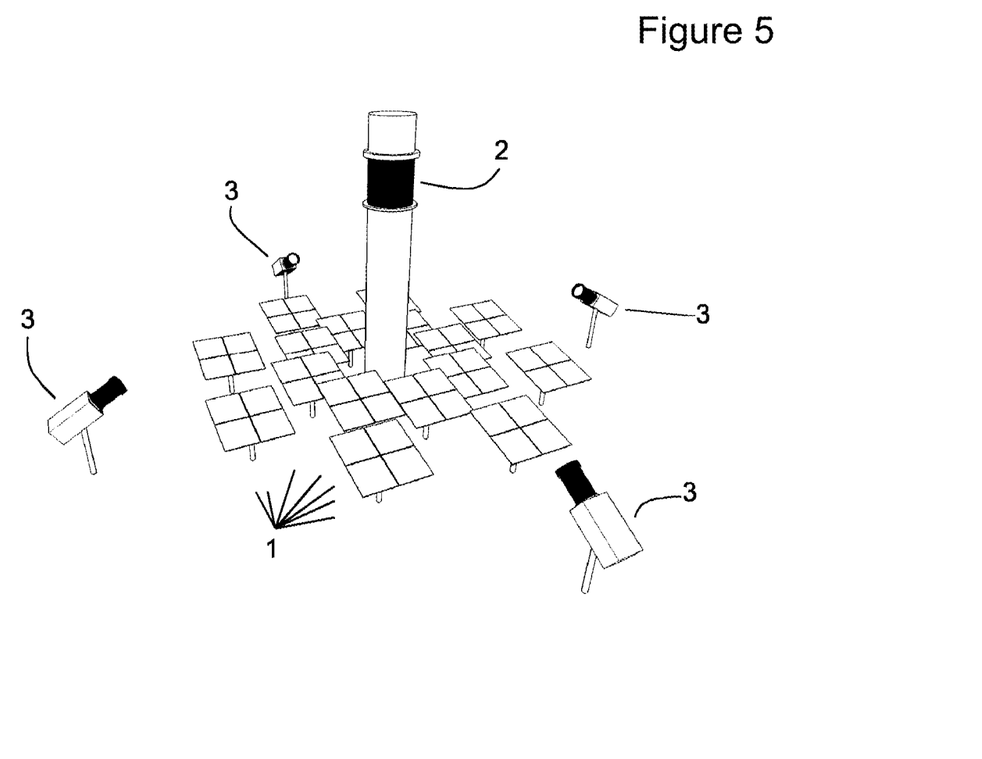
FIG. 5 shows a second exemplary embodiment of an apparatus according to the invention, having a cylindrical radiation receiver.

FIG. 5 illustrates a second exemplary embodiment of a calibration apparatus according to the invention. In this exemplary embodiment, the reflectors 1 are arranged around a cylindrically embodied radiation receiver 2 in a ring-shaped manner. Consequently, the energetic aperture of the radiation receiver 2 corresponds to the lateral surface of the cylindrically embodied radiation receiver. Since the entire lateral surface cannot be captured in its entirety by one camera, the calibration apparatus according to the second exemplary embodiment has 4 cameras 3, which are arranged in uniformly distributed fashion on a common circumference, with the radiation receiver 2 forming the center. Consequently, a common camera image of the entire lateral surface of the radiation receiver 2 can be produced by superposing the four camera images, said common camera image serving to record the picture element series.

The reflectors 1 of the second exemplary embodiment are likewise embodied to be swivelable about two axes. The calibration apparatus of the second exemplary embodiment has a calibration unit in a manner analogous to the calibration apparatus illustrated in FIG. 1, said calibration unit being embodied as a computer and being connected both to the motor-driven drives of the reflectors 1 and to the four cameras.

Figure 6:
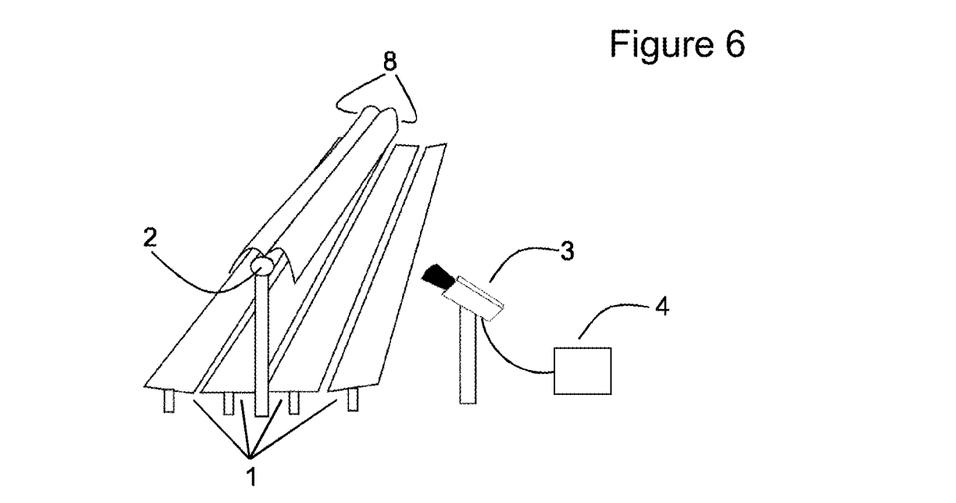
FIG. 6 shows a third exemplary embodiment of an apparatus according to the invention, embodied as a linear collector.

FIG. 6 illustrates a third exemplary embodiment of the calibration apparatus according to the invention. This calibration apparatus is embodied as a linear collector and has a plurality of reflectors 1 that are swivelable about one axis. By these reflectors 1, sunlight is concentrated, via two stationary, immovable secondary reflectors 8, on a radiation receiver 2 that is embodied as a linear collector. Here, too, transport fluid likewise flows through the radiation receiver 2 in order to transmit the heat produced by the sunlight to an energetic process.

The calibration apparatus according to the third exemplary embodiment also comprises a camera 3, which is connected to calibration unit 4. The calibration unit 4 has an embodiment that is analogous to the calibration units described above and, in particular, it likewise has the function of a tracking unit. To this end, it is connected to the motor drives of the reflectors 1 by a radio link. The link can likewise be implemented by cables.

Figure 7A:
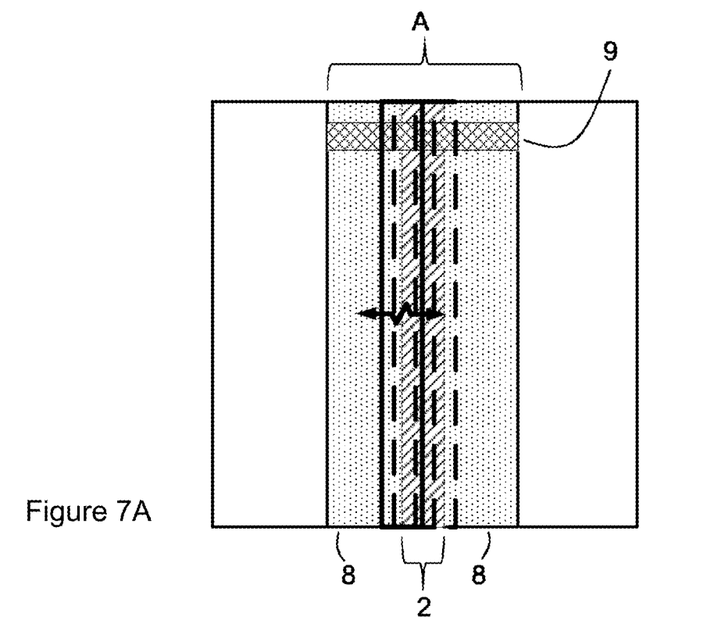
FIGS. 7A and 7B show schematic illustrations of the calibration surface according to FIG. 6.
Figure 7B:
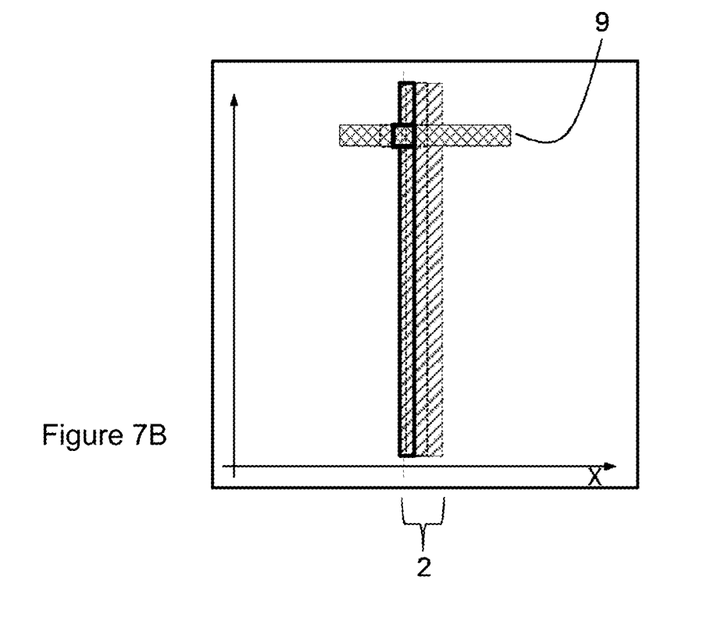

FIGS. 7A and 7B illustrate schematic illustrations of the field of view of the camera 3:

As is evident from partial image a), the field of view of the camera 3 covers a region A, which includes the radiation receiver 2 that, lying centrally, is embodied as a linear collector and which also includes the surrounding secondary reflectors 8.

Due to the directed reflection of the secondary reflectors 8, which are embodied to reflect the solar rays reflected by the reflectors 1 onto the radiation receiver 2, said secondary reflectors are not suitable as a background of a measurement image for the camera 3. For this reason, the calibration apparatus has a diffusely reflecting surface 9, which extends transversely to the direction of extent of the radiation receiver 2. The diffusely reflecting surface 9 has a width of a few centimeters, approximately 5 cm in the present case, and a length A of 30 cm in the present case (which corresponds to the aperture width of the secondary reflector), and it serves to scatter radiation at least partly in the direction of the camera, even outside of the region of the radiation receiver 2.

A calibration can be implemented, in particular, by the method described as first exemplary embodiment:

Periodic movements are impressed on the reflectors 1 by the calibration unit 4, said periodic movements having the same phase and the same amplitude but different frequency. The periodic movement of a reflector is indicated through the thickly outlined region in exemplary fashion in FIGS. 7A and 7B by the arrows. The strip-like reflection region of this reflector moves to the right and left along the arrow tips due to the impressed movement; i.e., the movement is implemented perpendicular to the elongate extent of the radiation receiver 2. However, outside of the diffusely reflecting surface 9, this movement is only detectable on the radiation receiver 2 by the camera. This is illustrated schematically in FIG. 7B. The periodic movement, which is impressed on the reflector, can only be detected in entirety thereof on the diffusely reflecting surface 9.

Therefore, the evaluation is preferably only implemented in those picture element series whose locations lie on the diffusely reflecting surface 9.

The evaluation per se is implemented in a manner analogous to the first described exemplary embodiment of a method according to the invention: a movement center can be determined by way of forming a centroid by filtering on the basis of the excitation frequency of each reflector and creating a brightness amplitude image for each reflector, said movement center representing the target reflector position. A comparison with the intended reflector position facilitates the ascertainment of a deviation.

The invention claimed is:

1. A calibration method for a group of reflectors (1) for concentrating solar radiation onto a radiation receiver (2), the method comprising:
A) aligning the reflectors in order to at least partly impinge a calibration surface (6) with solar radiation reflected by the reflectors (1);
B) producing a change in an intensity distribution of the solar radiation incident on the calibration surface (6) by carrying out a movement pattern by each of the reflectors in the group, wherein the movement pattern of each said reflector differs in at least one specified movement pattern parameter contained in the group of
 frequency of movement,
 amplitude of movement,
 phase angle of movement,
trajectory of the solar radiation, reflected by the reflector, within the calibration surface,
 from the movement pattern parameters of the other reflectors (1);
C) recording picture element series for a plurality of spatially different locations on the calibration surface (6) by at least one camera (3), wherein each said picture element series has at least five time-offset picture element frames;
D) ascertaining a spectrum for each said picture element series by a transformation of the picture element series into frequency space;
E) assigning a spectra subset to the reflectors (1) depending on the movement pattern parameter of the reflector;
F) determining at least one reflection target position for each said reflector depending on at least the spectra subset assigned to the reflector.

2. The method as claimed in claim 1, further comprising filtering the spectra in respect of one or more specified frequencies.

3. The method as claimed in claim 1, further comprising moving each of the reflectors (1) periodically in order to obtain a periodic change in the intensity distribution of the calibration surface (6).

4. The method as claimed in claim 3, each said picture element series in each case has a plurality of frames for a plurality of periods of the periodic change.

5. The method as claimed in claim 3, further comprising specifying a different frequency as the movement pattern parameter for each said reflector and a spectra subset, which comprises at least the spectra of that frequency, which correspond to the movement pattern parameter of the reflector, is assigned to each said reflector.

6. The method as claimed in claim 3, further comprising specifying a different amplitude as the movement pattern parameter for each said reflector, in that a movement amplitude is determined for the spectra of at least a spectra selection of the spectra and in that a spectra subset of the spectra selection is assigned to each reflector, said spectra subset having a movement amplitude, which corresponds to the amplitude movement pattern parameter of the reflector.

7. The method as claimed in claim 3, further comprising a different phase is specified as the movement pattern parameter for each said reflector, in that respectively one phase is determined for the spectra of at least a spectra selection of the spectra and in that a spectra subset is assigned to each reflector depending on the phase movement pattern parameter.

8. The method as claimed in claim 3, further comprising specifying a different trajectory as the movement pattern parameter for each said reflector, in that a spectra subset is assigned to each said reflector depending on the trajectory movement pattern parameter by image processing, at least for spectra of at least one spectra selection of the spectra, and the spectra selection is determined for each spectrum of at least a spectra selection.

9. The method as claimed in claim 1, wherein a different trajectory of the solar radiation reflected by the reflector is specified within the calibration surface (6) as the movement pattern parameter for each said reflector, and the specified trajectories intersect with at least one further specified trajectory at at least one point and, depending on superposition points of the specified trajectories, each said reflector is assigned a spectra subset by image processing, at least for the spectra of at least one spectra selection of the spectra.

10. The method as claimed in claim 1, wherein the spectrum of each picture element series is created by the Fourier transform.

11. The method as claimed in claim 1, wherein the calibration surface (6) at least partly covers an energetic aperture of the radiation receiver.

12. A calibration apparatus for a group of reflectors (1) for concentrating solar radiation onto a radiation receiver (2), the calibration apparatus comprising: a group of reflectors (1) including motor drives for positioning each said reflector in order to concentrate solar radiation onto a radiation receiver (2), at least one camera, a calibration surface, a calibration unit (4) configured to interact with the motor drives and the camera (3) for
  A) aligning the reflectors (1) by the motor drives in order to at least partly impinge the calibration surface (6) with solar radiation reflected by the reflectors (1);
  B) producing a change in an intensity distribution of the solar radiation incident on the calibration surface (6) by carrying out a movement pattern by each said reflector in the group, wherein the movement pattern of each said reflector differs in at least one movement pattern parameter, specified by the calibration apparatus, in the group of
    frequency of movement,
    amplitude of movement,
    phase angle of movement,
    trajectory of the solar radiation, reflected by the reflector, within the calibration surface,
    from the movement pattern parameters of the other reflectors (1);
  C) recording picture element series for a plurality of spatially different locations on the calibration surface (6) by the camera (3), wherein each picture element series has at least five time-offset picture element frames;
  D) ascertaining a spectrum for each picture element series by a transformation of the picture element series into frequency space;
  E) assigning a spectra subset to the reflectors (1) depending on the movement pattern parameter of the reflector;
  F) determining one or more reflection target positions for each reflector depending on at least the spectra subset assigned to the reflector.

13. The apparatus as claimed in claim 12, wherein the calibration surface (6) comprises a diffusely reflecting surface (9).

14. The apparatus as claimed in claim 12, wherein the calibration surface (6) covers an edge of an energetic aperture of a radiation receiver for the solar radiation.

15. The apparatus as claimed in claim 12, wherein the at least one camera comprises a plurality of cameras which are arranged at different recording angles in relation to the calibration surface (6) and the calibration apparatus is embodied to record picture element series for a multiplicity of spatially different locations of the calibration surface (6) by the cameras, each said picture element series has at least five time-offset picture element frames.

16. The method as claimed in claim 3, wherein each of the reflectors (1) is simultaneously moved in periodic fashion, and the periodic change in the intensity distribution of the calibration surface (6) that is obtained by the movement of the reflectors (1) lies in the frequency range of 0.001 Hz to 1 MHz.

17. The method of claim 5, wherein the spectra which comprise the spectrum of that frequency, which corresponds to the movement pattern parameter of the reflector, is assigned to each said reflector or in that a spectra subset, which comprise the spectra of that frequency, which correspond to the movement pattern parameter of the reflector and comprise the spectra of at least an integer multiple frequency of the frequency that corresponds to the movement pattern parameter of the reflector is assigned to each said reflector.

18. The method of claim 6, wherein the spectra selection is determined for each said reflector, said spectra selection comprises at least the spectrum with the frequency of the movement of the reflector.

19. The method of claim 7, wherein the spectra selection is determined for each said reflector, said spectra selection comprising at least the spectrum with the frequency of the movement of the reflector.

20. The method of claim 8, wherein the spectra selection is determined for each said reflector comprises at least the spectrum with the frequency of the movement of the reflector.

* * * * *